(12) United States Patent
Bauknecht

(10) Patent No.: US 7,963,253 B1
(45) Date of Patent: Jun. 21, 2011

(54) ROTATING ANIMAL GROOMING DEVICE

(76) Inventor: Carey A Bauknecht, Keswick, VA (US)

( * ) Notice: Subject to any disclaimer, the term of this patent is extended or adjusted under 35 U.S.C. 154(b) by 0 days.

(21) Appl. No.: 12/435,293

(22) Filed: May 4, 2009

Related U.S. Application Data

(63) Continuation-in-part of application No. 11/432,141, filed on May 11, 2006, now abandoned.

(60) Provisional application No. 60/679,984, filed on May 12, 2005.

(51) Int. Cl.
*A01K 13/00* (2006.01)

(52) U.S. Cl. ............ 119/608; 119/600; 119/609; 15/28; 451/359; 132/119.1

(58) Field of Classification Search .................. 119/631, 119/600, 625, 633, 602, 606, 601, 632, 608, 119/609, 616, 619, 620, 630, 615; D30/156, D30/154; 132/119.1, 120, 148; 15/28, 29; 451/359
See application file for complete search history.

(56) References Cited

U.S. PATENT DOCUMENTS

| | | | | |
|---|---|---|---|---|
| 246,020 A * | 8/1881 | Lawrence | | 119/633 |
| 632,730 A * | 9/1899 | Lodahl | | 119/608 |
| 822,050 A * | 5/1906 | Jenkins, Jr. | | 15/49.1 |
| 1,622,592 A * | 3/1927 | Kratz | | 451/359 |
| 1,643,882 A * | 9/1927 | Faiver | | 15/28 |
| 1,681,648 A * | 8/1928 | Root | | 451/522 |
| 2,000,930 A * | 5/1935 | De Nagy | | 415/53.1 |
| 2,854,829 A * | 10/1958 | Porter | | 464/159 |
| 3,416,177 A * | 12/1968 | Young | | 15/98 |
| 3,445,877 A * | 5/1969 | Stout | | 15/98 |
| 3,448,476 A * | 6/1969 | Zaccone | | 15/97.1 |
| 6,449,792 B1 * | 9/2002 | Myers | | 15/28 |
| 6,638,151 B2 * | 10/2003 | Ueno | | 451/359 |
| 6,645,309 B1 * | 11/2003 | Myers | | 134/6 |
| 2001/0005668 A1 * | 6/2001 | Sandell | | 451/359 |

* cited by examiner

*Primary Examiner* — Andrea M Valenti
(74) *Attorney, Agent, or Firm* — Sheldon H. Parker, Esq

(57) ABSTRACT

A grooming device for an animal has a rotating member with at least one pair of opposing connection members configured to interact with the receiving areas of a flex member. The receiving areas are configured to permit the connection members to move to enable the flex member to move from a parallel plane with the rotating member to a non-parallel plane. The flex member is maintained spaced from the rotating member through the use of springs placed between the two members forming a compression area. The curry ribs are at substantially right angles to, and affixed to, at least a portion of the exterior periphery of the flex member. The curry ribs can be removable from the flex member or permanently secured to the surface.

14 Claims, 10 Drawing Sheets

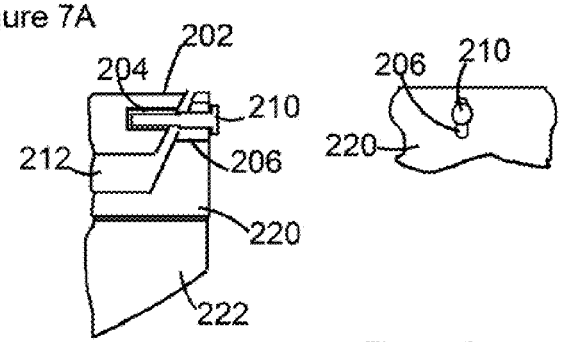
Figure 7A
Figure 7B
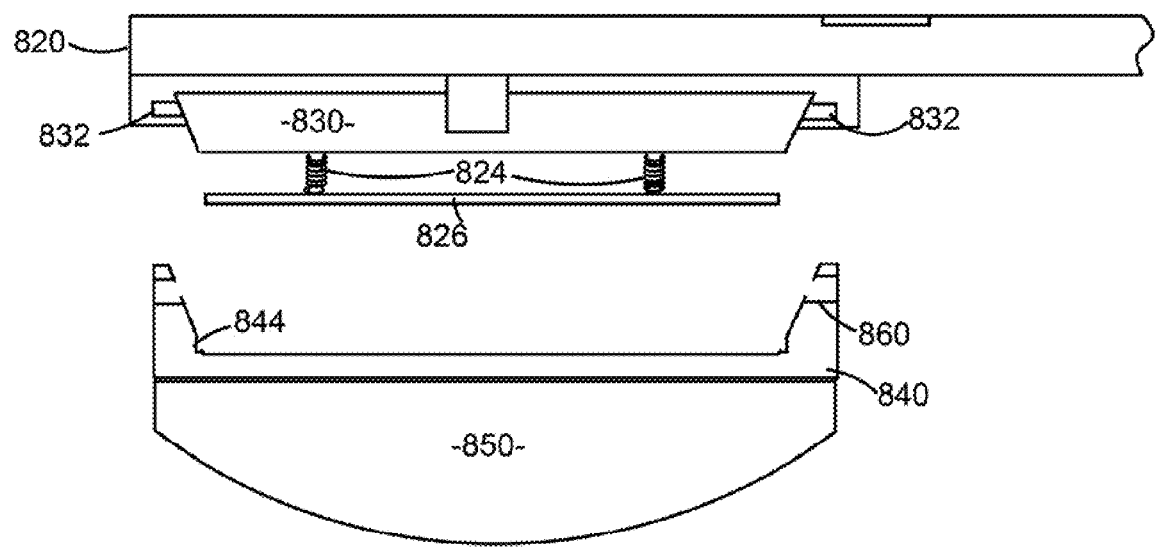
Figure 8
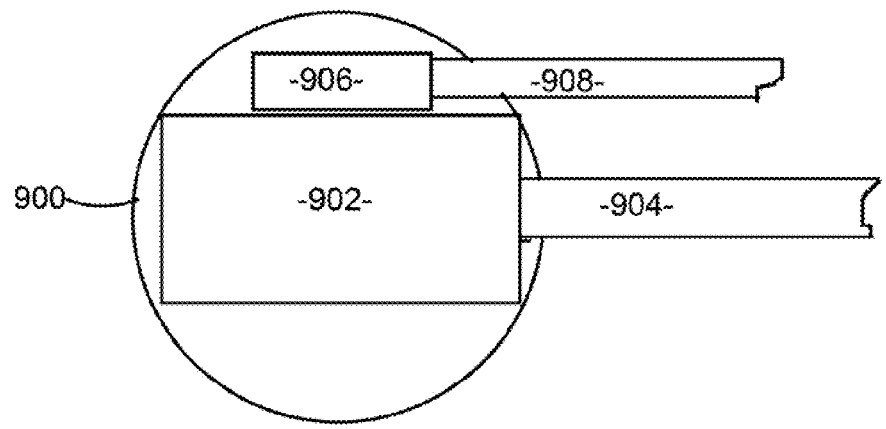
Figure 9

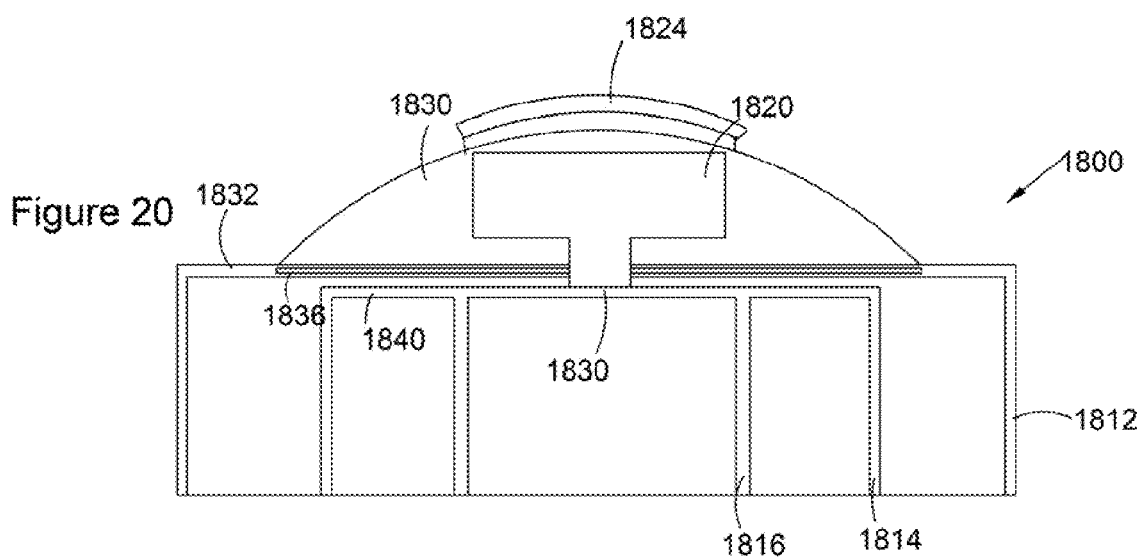
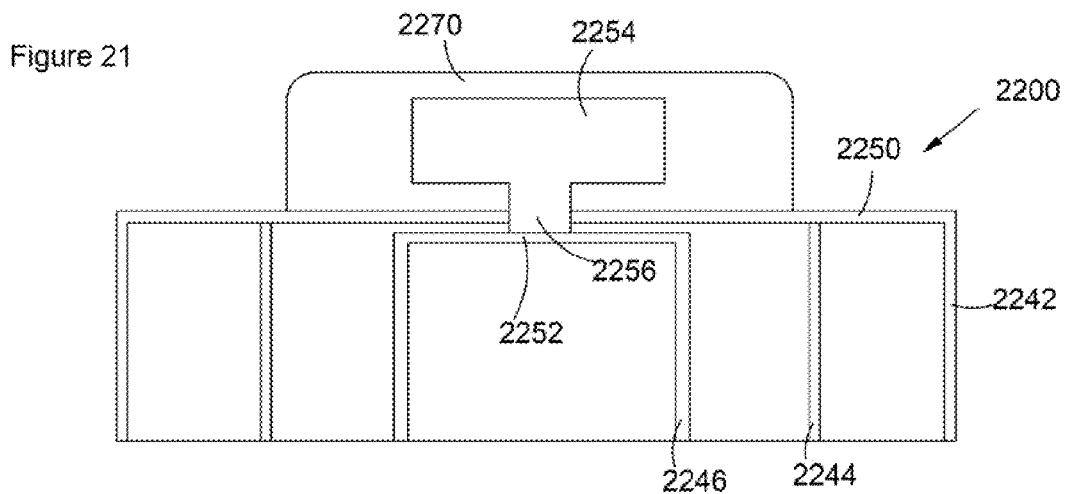
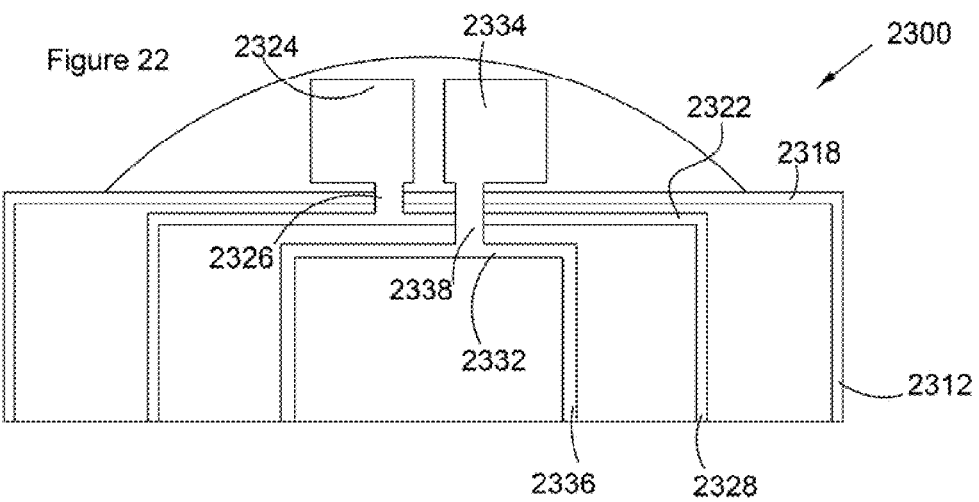

Figure 26
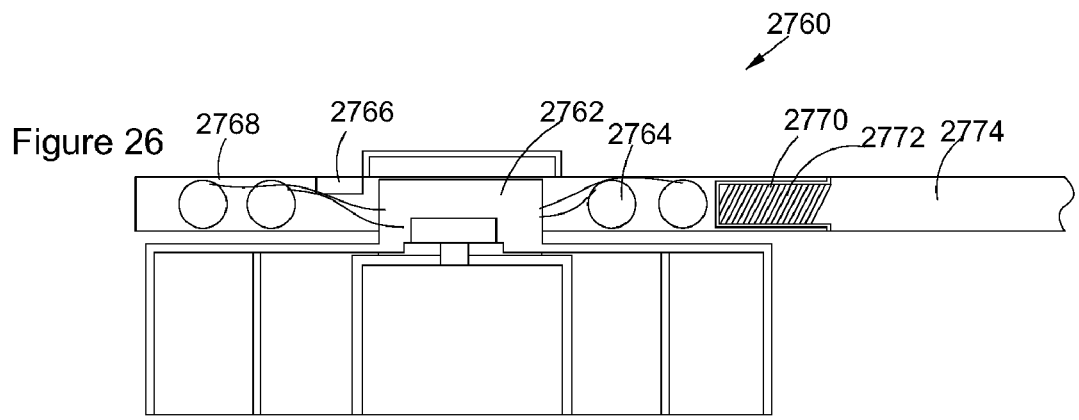
Figure 27
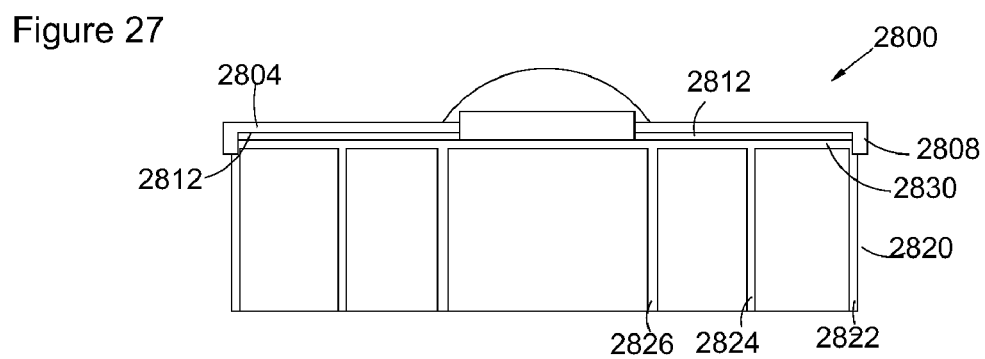
Figure 28
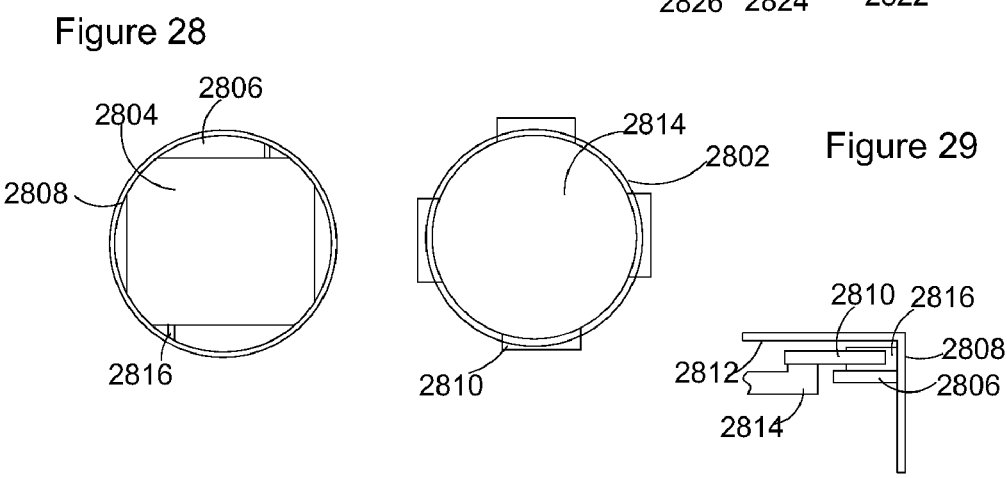
Figure 29
Figure 30

ROTATING ANIMAL GROOMING DEVICE

BACKGROUND

1. Field of the Invention

The present invention relates generally to an electronic grooming device for use with animals, and more particularly, to a rotating "curry" comb.

2. Related Art

Domesticated large animals such as horses, and other animals kept in zoos or exhibits, often need constant grooming in order to maintain a neat appearance, as well as to ensure a good and healthy skin and coat. Typically the animal is initially groomed with a rubber, or similar material, curry comb to stimulate blood flow, to promote healthier skin, and remove dead hair. The animal is then generally brushed with a bristled brush to remove the hair, dander, dirt, etc. The rubber curry comb is preferably used in a circular motion, thereby causing the toothed curry ribs within the comb to engage the animal's skin and hair with and against the hair growth.

The proper grooming of a large animal takes time and energy to properly, and repeatedly, cover the coat in a rotating motion. Although for an adult, grooming one horse would not become overly tiresome, for a child, or adult grooming multiple horses, the repeated currying motion can be come tiresome.

The disclosed electronically rotating curry comb enables the user to properly groom an animal, such as a horse, without the physical effort required using prior art curry combs. This is most advantageous for those with physical restrictions, such as arthritis, MS, etc., especially in light of the recent popularity of using the caring and riding of horses as therapeutic tools.

SUMMARY

A grooming device for an animal is disclosure that has a body consisting of an upper housing and a base plate, both of which have peripheries. The housing contains the motor, a power source and a control mechanism. The control mechanism controls the power to the motor as well as, in some embodiments, the speed of rotation. The device can be powered through batteries, air or electricity. Additionally, a vacuum device can be added to any of the embodiments.

In one embodiment a rotating member is affixed to the motor to rotate therewith. At least one pair of connection members are opposing one another and configured to interact with the receiving areas of a flex member. The receiving areas is configured to permit the connection members to move within the receiving areas to enable the flex member to move from a parallel plane with said rotating member to a non-parallel plane.

The flex member has an interior periphery and an exterior periphery, with the interior periphery being greater than the periphery of the rotating member. The flex member is maintained spaced from the rotating member through the use of springs placed between the two members forming a compression area. The springs can be retained in place through use of posts or other convenient means. The compression area enables the movement to a non-parallel plane. In embodiments where the flex member is removable from the rotation member, the springs can be secured to a plate that is fits adjacent to the interior periphery of the flex member.

The curry ribs are at substantially right angles to, and affixed to, at least a portion of the exterior periphery of the flex member. The curry ribs can be removable from the flex member or permanently secured to the surface. When removable, the curry ribs can be affixed through a number of methods, for example through us of Velcro®, screws, pins or clamps. The curry ribs can be brush bristles, flexible massage extensions or other designs appropriate for use on an animal.

In one embodiment the connection members are prongs dimensioned to move freely within the receiving area. The receiving area has an entry channel, a connecting channel and an adjusting channel, with prongs moving within said adjusting channel. In another embodiment, the connection members are bolts and the receiving area is a slotted area.

At least one rotating plate, also having a periphery and being adjacent to the base plate, is connected to the motor. The periphery of the base rotating plate can be less or greater than that of the base plate. Curry ribs extend from, and are affixed to, the rotating plate at substantially right angles. The rotating plate and curry ribs can be removable from the base plate. The power source can be batteries or direct electrical connection. The grooming also has a handle. In one embodiment the handle can extend from the body at substantially right angles to the curry ribs. The handle in this embodiment can be permanently affixed or removable from the body. A grip, at substantially right angles to the body can also be incorporation, with the grip being permanent or removable. In another embodiment the handle can be attached to the body on either side and extend over the upper housing to enable a user to place a hand between the handle and the upper housing.

The curry ribs can be flexible concentric circles with all or some of the concentric circles rotating. In one embodiment a stationary concentric circle is affixed to the periphery of the base plate. Alternatively multiple concentric circles can be affixed to the base plate with only one or more concentric circles rotating. The grooming device can also have a second rotating base that has a periphery less than that of the rotating base and has at least one concentric circles attached thereto. When having multiple bases, they can rotate in opposite directions. A spacing mechanism, such as ball bearings, can be provided between the base plate and the rotating base to prevent the rotating base from buckling.

BRIEF DESCRIPTION OF THE DRAWINGS

The preferred embodiments of the present invention are shown by a way of example, and not limitation, in the accompanying figures, in which:

FIG. 7A is a cutaway side view of another embodiment for the attachment of the flex member and rotation member in accordance with the invention;

FIG. 7B is a front view of the attachment of FIG. 7A in accordance with the invention;

FIG. 8 is an alternate embodiment of the flexible rotating animal grooming device in accordance with the invention FIG. 9 is a top view of an embodiment having a vacuum in accordance with the invention;

FIG. 20 is a cutaway side view of the curry comb of FIG. 17 in accordance with the invention;

FIG. 21 is a cutaway side view of an alternate embodiment of the disclosed curry comb having a single rotating curry rib in accordance with the invention;

FIG. 22 is a cutaway side view of another embodiment of the disclosed curry comb having dual rotating curry ribs capable of rotating in opposite directions in accordance with the invention;

FIG. 26 is a side view of an alternate grooming head for use with the disclosed grooming device in accordance with the invention;

FIG. 27 is a side view of another embodiment of the disclosed grooming device in accordance with the invention;

FIG. 28 is a top view of an example of a removable attachment between the body of the grooming device and the grooming head in accordance with the invention;

FIG. 29 is a bottom view of the removable attachment of FIG. 28 in accordance with the invention;

FIG. 30 is a side view of the attachment of FIG. 28 in accordance with the invention;

DETAILED DESCRIPTION OF THE INVENTION

Definitions

For the purposes herein the term "ball bearing assembly" shall refer to a bearing assembly that uses spherical bearings as the rolling elements with the balls being maintained within "races". The types of bearing assemblies can include: a radial ball bearing assembly that uses axially symmetric inner and outer races that are shaped so a radial load passes radially through the bearing; angular contact ball bearing assembly that uses axially asymmetric races: axial ball bearing assemblies that use side-by-side races; or deep-groove radial bearing assembly in which the race dimensions are close to the dimensions of the balls that run in it. Deep-groove bearings have higher load ratings for their size than shallow-groove bearings, but are less tolerant of misalignment of the inner and outer races. The bearings can be placed in a full complement or caged.

For the purposes herein the term "curry comb" shall refer to any grooming device used on an animal constructed of a semi-rigid material for use on an animal.

For the purposes herein the term "curry ribs" shall refer to any type of material that is used to brush, groom, curry, massage, shed out, or perform any other grooming on an animal.

For the purposes herein the term "flex", "flexing" shall refer to the flex member moving out of parallel with the rotation member.

For the purposes herein the term "torque" shall refer to the rotational force of a motor with maximum torque being achieved at around zero rotations per minute.

For the purposes herein the term "spacing mechanism" shall refer to any mechanism, such as ball bearings, the permits rotation between two surfaces while maintaining the two surfaces at an equal distance apart.

For the purposes herein the term "variable speed mechanism" shall refer to mechanism used to vary speed of a motor, including but limited to an electronic speed control, potentiometer, adjustable speed drive, variable resistor, rheostat, etc. The disclosed invention relates to a novel animal grooming device that automates the circular motion required for effective grooming. In order to prevent injury to the animal or groomer, as well as the inconvenience of a cord, the grooming device is preferably battery operated, using rechargeable batteries, or otherwise operated using wind up, solar, or any other methods known in the art. Any motor, having an appropriate size and sufficient torque and rpm can be used and will be known to those skilled in the art. For example a dual speed (2.4V3.6V) having a no load rpm of 0 to about 200 at 2.4V and 0 to about 320 at 3.6V. In some applications, however, battery power cannot be sufficient and a direct electrical connection must be made, the application of which will be evident to those skilled in the art.

Figure 1:
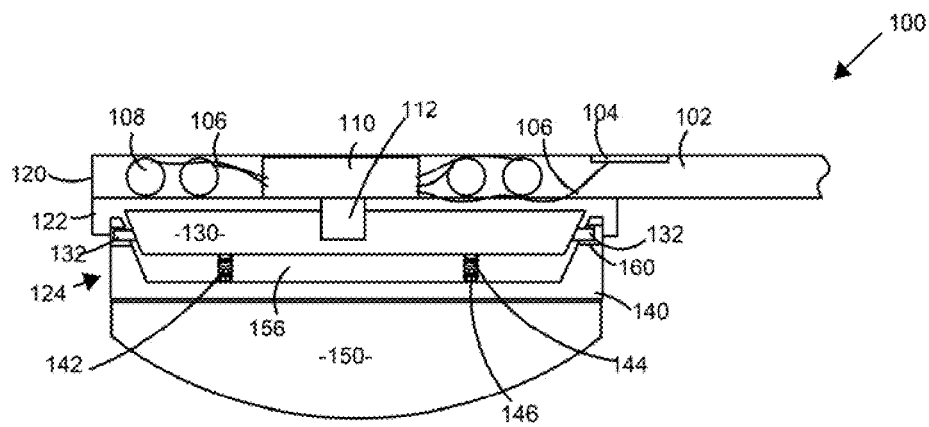
FIG. 1 is a cutaway side view of the flexible rotating grooming device in accordance with the invention.

The embodiment of FIG. 1 illustrates the rotating curry comb 100 having a handle 102, on/off and/or variable speed controls 104, wiring 106, batteries 108 and motor 110. A shaft 112 extends from the motor 110. The electronics housing 120 serves as the body for the grooming device 100, containing the batteries 108 and motor 110 which are connected to one another through use of electrical wires 106. It is advantageous in this as well as other embodiments that the batteries 108 are rechargeable, either within the grooming device 100 itself or as removable batteries to be placed in a separate recharger. Depending upon the embodiment, there can be one or more batteries used that are rechargeable through methods known in the battery art. The control panel 104, connected to the motor 110 through wire 106, contains the desired controls for the grooming device 100, such as on, off, and speed. In some embodiments the electronic housing 120 can include a variable speed mechanism, for varying the rotation speed which can be controlled through a multi-position switch, similar to that used on a hair dryer or an infinite number as provided by a variable speed mechanism.

It should be noted that the above components can be varied, as known in the art and as disclosed hereinafter.

The body 120 can be manufactured from any applicable material, although materials that can be molded, such as plastics, are most likely to be more cost effective over other methods and materials of manufacture. The body 120, in this embodiment, has a flange 122 that extends to cover the curry unit 124. The flange 122 prevents hair and dirt from entering the interior of the unit while still enabling the flexing unique to the device. Other designs can be used to create the same result and alternate designs will be known to those in the art.

The curry unit 124 is comprised of the rotating element 130 and the flex element 140 and curry 150. The rotating element 130 is in rotational connection with the shaft 112 and can rotate at the speed of the shaft 112 or be geared down to rotate at a slower pace. This will be dependent upon the motor 110 and will be evident to those skilled in the art. It is beneficial to provide some method of slowing rotation however as this can be accomplished in a number of known ways, the optimal method for the size, weight, materials, etc. will be known.

The rotating member 130 is movably connected to the flex member 140 in a manner that permits the flex member 140, and attached curry 150, to move to a position that is not necessarily parallel to the body 120 while still rotating. The flex member 140 is spaced from the rotation member 130 and flexibly distanced through use of springs 142. The height of the compression area 156 would be dependent upon the size of the device, however it would generally be less than one (1) inch in most handheld applications. The springs 142 are kept in position through the use of upper posts 144 and lower posts 146, although other methods for stabilization can be used. To provide stability and smooth movement, at least three post 144, 146 and spring 142 combinations should be used.

In the embodiment illustrated herein the sides of the rotation member 130 and flex member 140 are angled to prevent contact between the two members thereby enabling the flex member 140 to move from the plane parallel with the rotation member 130. It is critical that the spacing between the flex member 140 and the rotation member 130 be sufficient to prevent contact between the two members. Other designs can also be incorporated providing that they permit the flex member 140 to move into the compression area 156 without binding.

Figure 2:
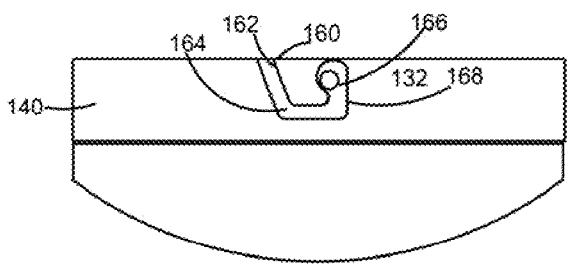
FIG. 2 is a side view of the flex member of the rotating grooming device in accordance with the invention.

The rotation member 130 has at least two prongs 132 that are dimensioned to either fit within, or extend beyond, receiving area 160, which is illustrated in greater detail in FIG. 2. The receiving area 160 permits the prongs 132 to float, thereby enabling the flex member 140 to move into the compression area 156.

The curry 150 is attached to the flex member 140 in any manner that would provide the stability required. This can be through Velcro, hose clamp (FIG. 3) or screws (FIG. 4). The bottom surface of the curry 150 preferably has a convex surface although flat surfaces can also be used.

The receiving area 160 is illustrated in more detail in FIG. 2 showing the entry channel 162, connecting channel 164 and adjusting channel 168. The dimensions of the prongs 132 must be slightly less than that of the entry channel 162, connecting channel 164 and adjusting channel 166 to permit a smooth, non-friction entry. This dimension would be dependent upon the materials being used, however about 0.001" to 0.002" would be appropriate for most applications. The prong 132 slides down the entry channel 162 and moves into the connecting channel 164 upon rotation of the flex member 140. Once the prong 132 reaches the adjusting channel 168, the springs 142 maintain the prong 132 at the top of the adjusting channel 168 when at rest. Once the prong 132 is positioned in the adjusting channel 166, the flex member 140 can move in relationship to the rotating member 130. It is preferably that the entry channel 162 is angled from the vertical, for example 10 degrees to 15 degrees, to help prevent inadvertent removal during use. In FIG. 2 the adjusting channel 168 has a rounded port 166. The corners, or transition points between the entry channel 162, connecting channel 164 and adjusting channel 168 are preferably curved with a radius slightly greater than that of the prong 132. This enables smooth transitioning from one channel to the next and prevents binding.

The dimensioning between the prong 132 and entry channel 162, connecting channel 164, adjusting channel 168 and port 166 is critical to prevent the prong 132 from binding. Depending upon construction materials, size and movement, at least a 0.005 inch clearance is necessary.

It is critical that the rotation of the motor 110 be in a direction that forces the prong 132 against the far wall 168 of the adjusting channel 168 to prevent the prong 132 from moving back into the connecting channel 164 and providing the opportunity for inadvertent removal of the flex member 140. It should be noted that although only one receiving area 160 has been describe in detail heretofore, this description applies to all receiving areas 160.

Figure 3:
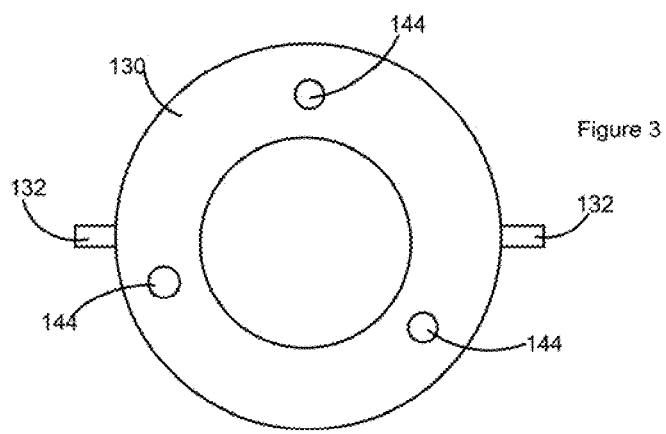
FIG. 3 is a bottom view of the rotating member in accordance with the invention.
Figure 4:
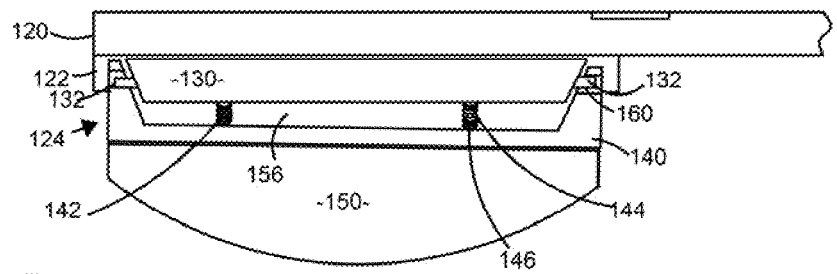
FIG. 4 is a cutaway side view of the grooming device of FIG. 1 with the flex member in a non-parallel position with the rotating member in accordance with the invention.

An example placement of the posts 144 and prongs 132 on the rotating member 130 is illustrated in FIG. 3. It should be noted that this is an example placement and the critical feature is that the prongs 132 line up with the entry channel 162. Other spacing and numbers of prongs 132 and posts 144 will be evident to those skilled in the art.

In FIG. 4 the curry unit 124 is shown in a flexed position. As can be seen this figure, the left side of the flex member 140 extends further in to the compression area 156.

Figure 5A:
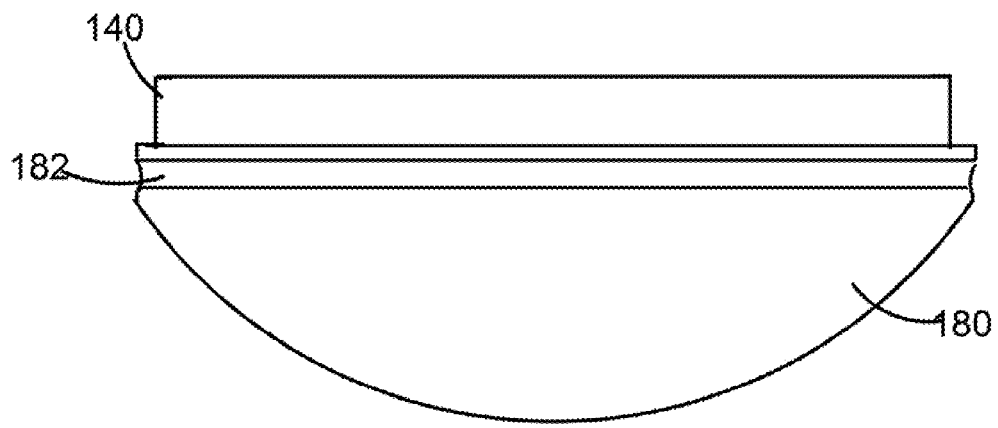
FIG. 5A is a side view of an alternate embodiment to attach the curry to the flex member in accordance with the invention.
Figure 5B:
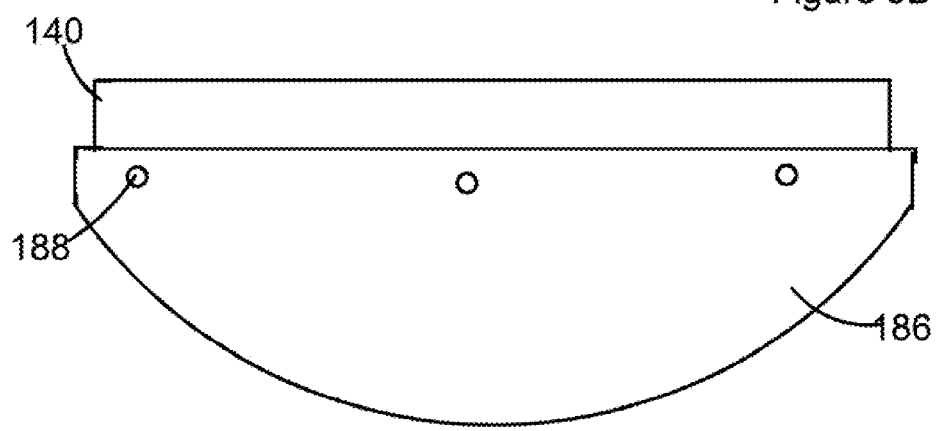
FIG. 5B is a side view of an additional embodiment to attach the curry to the flex member in accordance with the invention.

In FIG. 5A the curry 180 is maintained on the flex member 140 through the use of a flexible clamp 182. In FIG. 5B, the curry 186 is maintained in place through the use of screws or pins 188. These are only two examples of how the curry can be maintained on the flex member 140. As an alternative, the curry can be permanently adhered to the flex member 140 and the entire flex member 140 removed and replaced as illustrated in FIG. 8.

Figure 6:
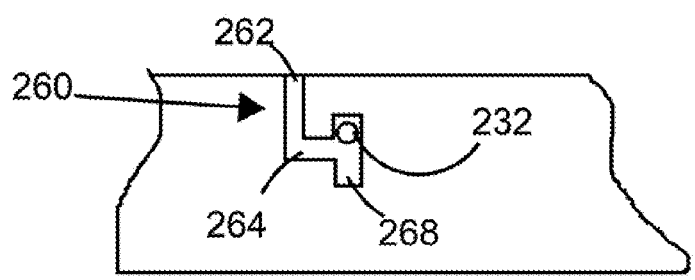
FIG. 6 is an alternate embodiment for the attachment of the flex member to the rotating member in accordance with the invention.

In FIG. 6 an example of an alternate receiving area 260 is illustrated wherein the entry channel 262, connecting channel 264 and adjusting channel 268 are at right angles to one another. The dimensioning of the prongs 232, depth of the channels 262, 264 and 268 are as noted heretofore. Other configurations of the receiving area can also be used if they enable the placement of the prongs into a position that enables the flex member to move into the compression areas.

An alternate embodiment is illustrated in FIGS. 7A and 7B with respect to the connection of the flex member 220 and the rotating member 202. The rotating member 202 has a threaded area 204 to receive the shoulder bolt 210. The diameter of the threaded area 204 and the threaded portion of the shoulder bolt 210 can be any applicable for standard or custom bolts, however the diameter should not be so great as to weaken the structural strength of either the flex member 220 or the rotating member 202. The bolt 210 passes through the elongated flex channel 206 which enables the flex member 202 to move into the compression area 212.

In FIG. 8, the flex member 840 and curry 850 are removable from the rotating member 830. In this configuration, it is preferable to have a plate 826 adhered to the springs 824 to maintain the proper placement. The plate 826 would fit in the notches 844 when the prongs 832 are placed into the receiving are 860. In this, as well as other embodiments, it is preferable to have some type of locking mechanism to prevent the flex member 840 from inadvertently coming off the rotating member 830.

In FIG. 9 and example of the top of the curry 900 is illustrated with the electronics housing 902 centered and handle 904 extending from the body 900. In this embodiment a vacuum housing 906 is placed adjacent to the electronics housing 902 with the hose 908 leading to a central collection area. The vacuum 906 for use with the disclosed curry is similar to the vacuum system of sanders and other hand tools. This is only one arrangement for the vacuum 906 and other arrangements will be obvious.

Figure 10:
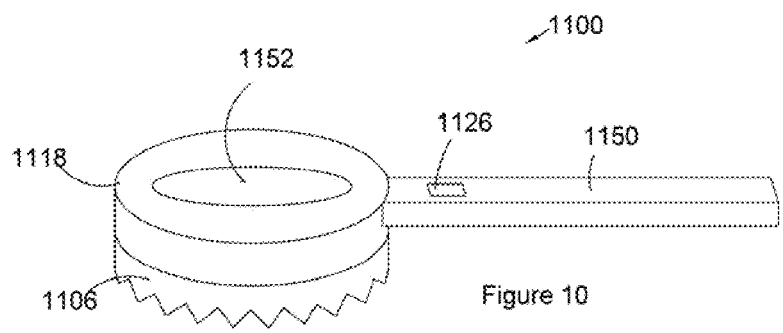
FIG. 10 is a perspective view of the animal grooming device having a handle in accordance with the invention.

In the embodiment of FIG. 10 the top of the electronic housing contains an optional pressure pad 1152 to cushion the user's hand while applying pressure to the head of the grooming device 1100. Since, in this embodiment, the user holds the handle 1150, it can be difficult to apply sufficient pressure to the head without tiring. Therefore, while holding the handle 1150 with one hand, the user can apply the palm of the other hand to the pressure pad 1152, thereby easily controlling the pressure applied.

Figure 11:
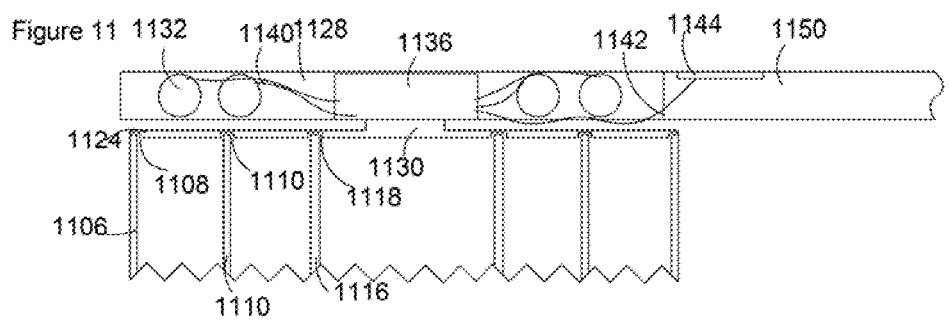
FIG. 11 is a cutaway side view of the animal grooming device of FIG. 1 having the curry ribs recessed into the secondary plate in accordance with the invention.

As can be seen in FIG. 11, the outer curry rib 1106, middle curry rib 1110 and inner curry rib 1116 of the grooming device 1100 are connected to a secondary plate 1124 that is affixed to the motor 1136 through a shaft 1130. As stated heretofore, the motor 1136 can be of any design known in the art that will provide sufficient rotational force to maintain the rotation of the outer curry rib 1106, middle curry rib 1110 and inner curry rib 1116 while sufficient pressure is being applied to effective groom the animal without causing irritation to the animal.

Figure 24:
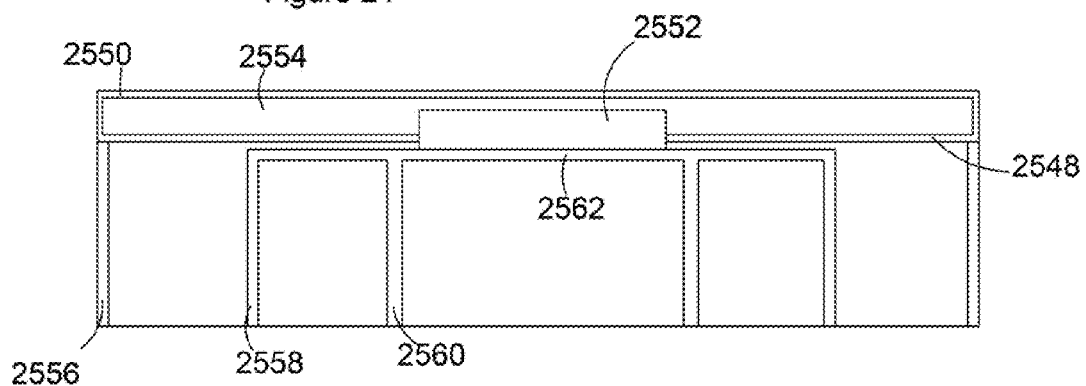
FIG. 24 is a cutaway side view of an embodiment having dual rotating curry ribs with a recessed motor in accordance with the invention.

Sufficient distance must be left between the top of the secondary plate 1124 and the electronics housing 1128 to permit free rotation of the secondary plate 1124. Additionally, the materials of manufacture can be such that buckling of the secondary plate 1124 is prevented under the pressure applied during use. The greater the diameter of the unit the greater the possibility of buckling. One method of preventing buckling of the secondary plate 1124, as illustrated hereinafter in FIG. 24, is the use of ball bearings. Another method would be to use materials with a rigidity and weight sufficient to prevent the buckling. Ball bearings, or other support system, can be incorporated into any of the designs disclosed herein to separate the rotating secondary plate from the top base plate.

As the preferred material for the portion of a curry comb that contacts the horse is a semi-rigid material, such as natural or synthetic rubber, the connection between the semi-rigid material and the harder support plate must be secure to prevent the semi-rigid material from tearing from the support plate. One method, as illustrated in FIG. 11 would be to manufacture the secondary plate 1124 with outer groove 1108, middle groove 1112 and inner groove 1118 dimensioned to support the curry ribs 1106, 1110 and 1116. The curry ribs 1106, 1110 and 1116 can be recessed into the respective groove 1108, 1112 and 1118 where they are adhered by methods compatible with the materials. Other methods will be evident to the manufactured based upon materials used.

Figure 12:
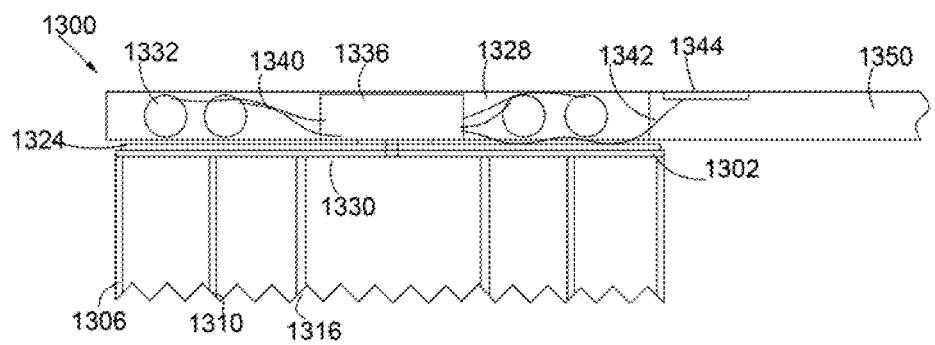
FIG. 12 is a cutaway side view having the curry ribs attached directly to the secondary plate in accordance with the invention.

FIG. 12 illustrates curry device 1300 that incorporates an alternate method of attaching the outer curry rib 1306, middle curry rib 1310 and inner curry rib 1316 to the support plate 1324. In this embodiment the curry ribs 1306, 1310 and 1316 are manufactured integral with the curry base 1302 and the curry base 1302 is adhered directly onto the support plate 1324. As stated in conjunction with FIGS. 10 and 11, the support plate 1324 must be maintained a sufficient distance from electronics housing 1328.

As with the embodiment in FIGS. 10 and 11, the motor 1336 is electronically connected to the batteries 1332 through wires 1340. The control panel 1344, located in the handle 1350, is connected to the motor through wire 1342.

Figure 13:
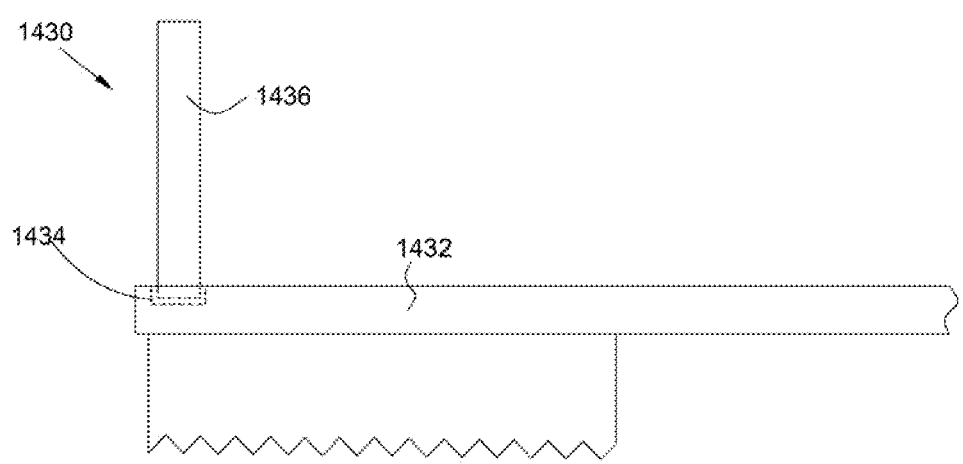
FIG. 13 is an alternate embodiment of the grooming device having a grip in accordance with the invention.

In FIG. 13 the grooming device 1430 is essentially the same construction as that of FIGS. 10, 11 and 12 however a grip 1436 is provided to assist in the application of pressure by the user. In this embodiment the grip 1436 is threaded and placed into threaded hole 1434 at approximately right angles to the electronic housing 1432. This is an example of a design and it should be noted that the grip can be of any design practical and be connected at any point and through any means that would be convenient for use.

Figure 14:
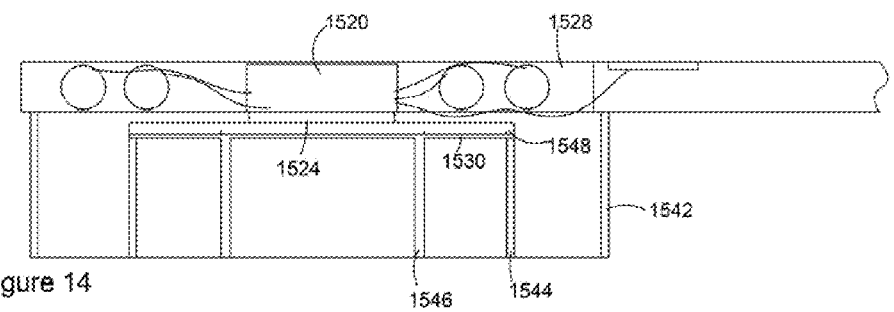
FIG. 14 is a cutaway side view of an alternate embodiment having the two interior curry ribs rotating and the exterior curry rib stationary in accordance with the invention.
Figure 15:
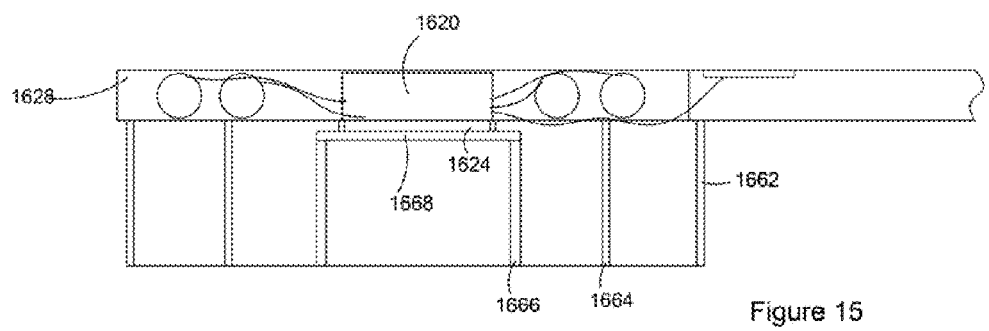
FIG. 15 is a cutaway side view of an embodiment having a single interior rotating curry rib and two stationary ribs in accordance with the invention.
Figure 16:
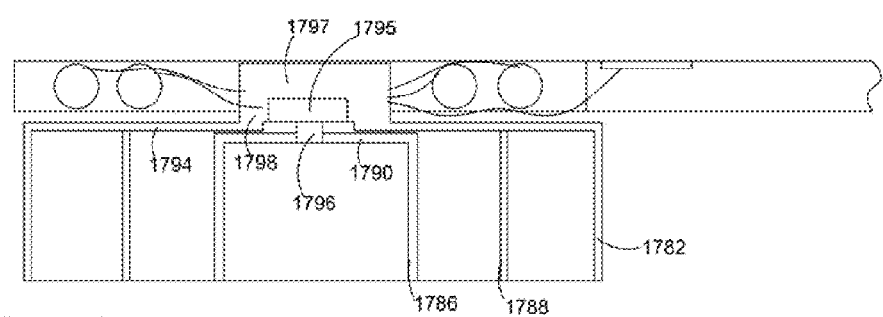
FIG. 16 is a cutaway side view of an additional embodiment having curry ribs rotating is opposing directions in accordance with the invention.

The construction of the grooming device in FIGS. 14-16 remains basically the same as disclosed heretofore with respect to the rotation, the difference lying in the number of curry ribs rotating and the direction of the rotation. In FIG. 14 the outer curry rib 1542 is directly connected to the electronics house 1528 and, therefore, remains stationary. The middle curry rib 1544 and inner curry rib 1546, are independent from the outer curry rib 1542 and are connected to a rotating supplemental plate 1548. The supplemental plate 1548 is connected to the motor 1520 through shaft 1524. The middle curry rib 1544 and inner curry rib 1542 are integral with the curry base 1530 which is, in turn, connected to the supplemental plate 1548 as noted above. Also as noted above, alternate methods of connecting the outer curry rib 1542, middle curry rib 1544 and inner curry rib 1546, as either disclosed heretofore or known to those skilled in the art, can be used.

The embodiment illustrated in FIG. 15, both the outer curry rib 1662 and middle curry rib 1664 remain stationary and are attached directly to the electronics house 1628. In this design motor 1620 is connected, through shaft to the secondary plate 1660 to rotate only the inner curry rib 1668. The construction of the embodiment of FIG. 14 and FIG. 15 are similar with the difference being the number of curry ribs that are being rotated.

In FIG. 16 the outer curry rib 1782 and middle curry rib 1788 are secured to secondary plate 1794 which is in contact with the primary motor 1797 through a cylindrical shaft 1798. The inner curry rib 1786 is affixed to, or integral with, the stationary plate 1790 which is connected to the secondary motor by the interior shaft 1796, to enable rotation in a direction opposing rotation of the primary motor. It should be noted that this is one example of a method to obtain dual directional rotation and other methods, known to those skilled in the art, will be evident. Additionally, although FIG. 16 illustrates the outer curry rib 1782 and middle curry rib 1784 rotating in a first direction with the inner curry rib can be 1786 rotating in the opposing direction, the ribs can be grouped in any manner desired by the manufacturer.

Figure 17:
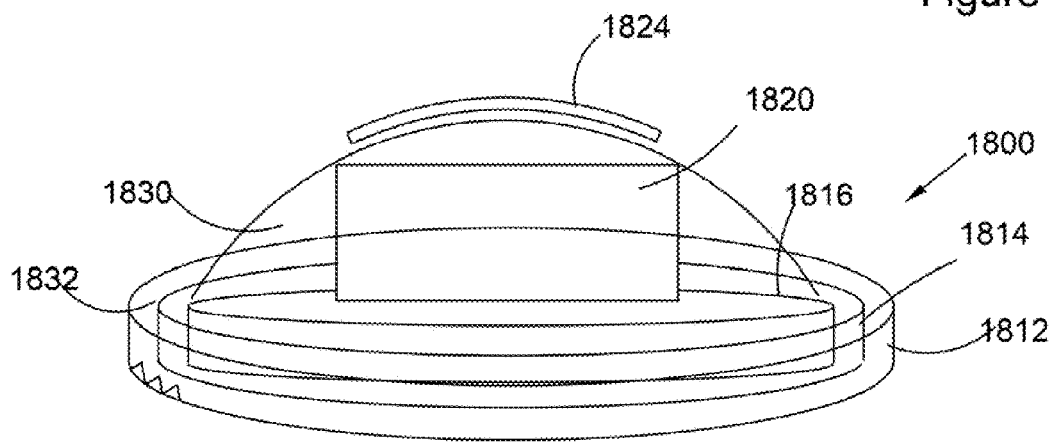
FIG. 17 is a perspective view of an alternate design of the instant grooming device in accordance with the invention.
Figure 18:
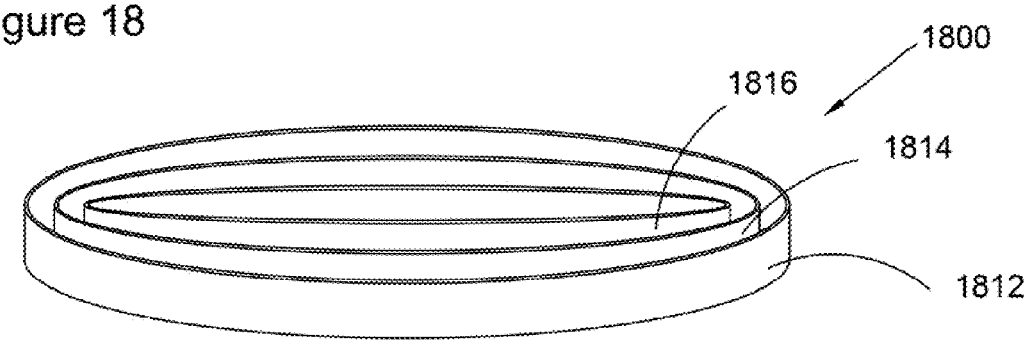
FIG. 18 is a perspective view of the bottom of the disclosed curry comb of FIG. 17 in accordance with the invention.
Figure 19:
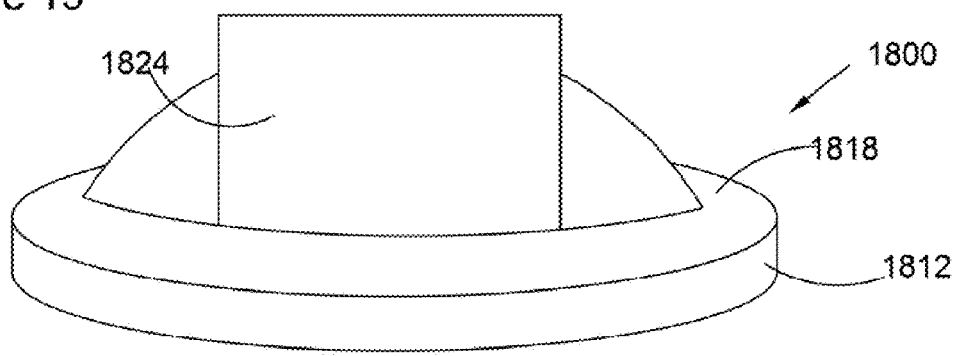
FIG. 19 is an additional top view of the curry comb of FIGS. 17 and 18 in accordance with the invention.

FIGS. 17-19 illustrate the grooming device 1800 which has two rotating curry ribs, middle curry rib 1814 and inner curry rib 1816. The outer curry rib 1812 in this embodiment remains stationary. The upper housing 1830 and base plate 1832 serve as the housing for the grooming device 1800, with the stationary outer curry rib 1812 extending at substantially right angles to the base plate 1832. The electronics (not shown) and the motor 1820 are maintained within the upper housing 1830 and the base plate 1832. The rotating middle curry rib 1814 and inner curry rib 1816 are affixed to a secondary plate 1840 that is, as previously described, attached to motor 1820 by shaft 1830. When the material of manufacture is compatible with use on an animal the outer curry rib 1812 can be molded as an integral piece of the base plate 1832. When the animal compatible materials are too flexible and soft to provide optimum support, a reinforcement plate 1836 can be added to provide the support required to attach the base plate 1832 to the motor housing 1830. The reinforcement plate 1836 can be molded into the material of manufacture of the base plate 1832 or added as a separate piece with the base place 1832 being affixed to the reinforcement plate 1836 in a manner known in the art. However, when the material of manufacture for the base plate 1832 is not compatible with use on an animal, the outer curry rib 1812 and the base plate 1832 would be molded separately and joined during the manufacturing process. The hand strap 1824 is also molded into, or adhered to, the exterior surface of either the upper housing 1830 or the base plate 1832.

As can be seen in more detail in FIG. 20 the motor 1820 is connected to a secondary plate 1840 from which the middle curry rib 1814 and inner curry rib 1816 extend. The motor 1820 can be of any design known in the art that will provides sufficient rotational force to maintain the rotation of the middle curry rib 1814 and inner curry rib 1816 while pressure has been applied.

The upper housing 1830 is used to protect the user's hand from the motor 1820 and can be any shape that provides comfort to the user and permits sufficient space for the motor. The hand strap 1824 is redimensioned from a standard curry comb to compensate for the height of the upper housing 1830 to enable the user's hand to easily, and comfortably, fit between the underside of the hand strap 1824 and the upper housing 1820.

In the curry device 2200 the embodiment illustrated in FIG. 21, the outer curry rib 2242 and middle curry rib 2244 remain stationary and are affixed to, or integral with, the base plate 2250. The motor 2254 is connected, through a shaft 2256, to the secondary plate 2252 to rotate only the inner curry rib 2246. As with FIGS. 14 and 15, the construction of the embodiments of FIG. 21 and FIG. 22 are similar in that not all curry ribs are being rotated. In the embodiment illustrated in FIG. 21 the electronics housing 2270 is rectangular with rounded edges to prevent irritation to the user's hand.

In FIG. 22 the outer curry rib 2312 of curry device 2300 is, as previously described, stationary and affixed to, or integral with, the base 2318. In this embodiment, however, the middle curry rib 2328 of the grooming device 2300 is affixed to, or integral with, the secondary plate 2322 while the inner curry rib 2336 is affixed to, or integral with, the tertiary plate 2332, to enable opposing directional rotation. To obtain the dual rotation two motors 2324 and 2334 are used, although a single motor could be used with the appropriate gearing. In this embodiment motor 2334 is connected to tertiary plate 2332 by shaft 2338 and motor 2324 is connected to secondary plate 2322 by shaft 2326. In the illustrated embodiment, the tertiary plate 2332 and curry rib 2336, as well as the secondary plate 2322 and curry rib 2328, have been moved slightly off center with respect to the outer curry rib 2312. This enables the shafts 2338 and 2326 to remain centered within their respective plates. Alternatively, the curry ribs can remain all equally distant and the appropriate cams and gearing be used as known in the art.

Figure 23:
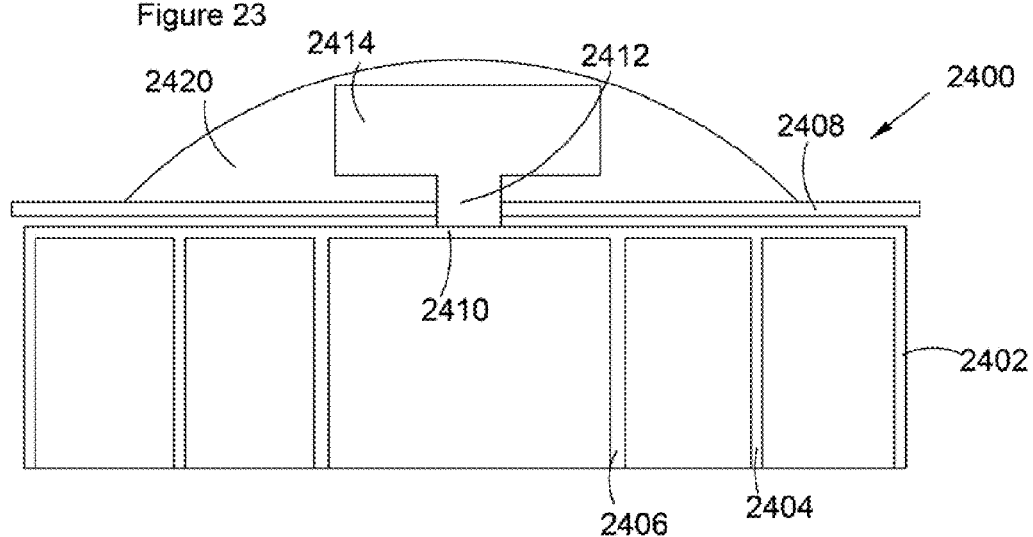
FIG. 23 is a cutaway side view of another embodiment having a protective base plate and outside rotating curry rib in accordance with the invention.

In the embodiment illustrated in FIG. 23 the outer curry rib 2402, middle curry rib 2404 and inner curry rib 2406 all rotate through their connection with the secondary plate 2410 that is connected directly to the motor 2414 through a shaft 2412. To protect the user's hand a stationary top plate 2408 is used and to prevent the user's fingers from coming in contact with the rotating outer curry rib 2402, the stationary top plate 2408 should extend beyond the secondary plate 2410. As described in prior embodiments, the electronics (not shown) are maintained within the electronics housing 2420.

In the embodiment illustrated in FIG. 24 the electronic housing 2554, containing the motor 2552 and other electronics (not shown) is placed between the top plate 2550 and the base plate 2548, leaving the top plate 2554 substantially flat. In this embodiment the outer curry rib 2556 remains stationary while the middle curry rib 2558 and inner curry rib 2560 both rotate. The recessed motor can also be incorporated in the designs of FIGS. 13-22. In this embodiment, due to the small space for the electronics and motor 2552, the unit would need to be easily rechargeable or directly connected to an electrical cord.

Figure 25:
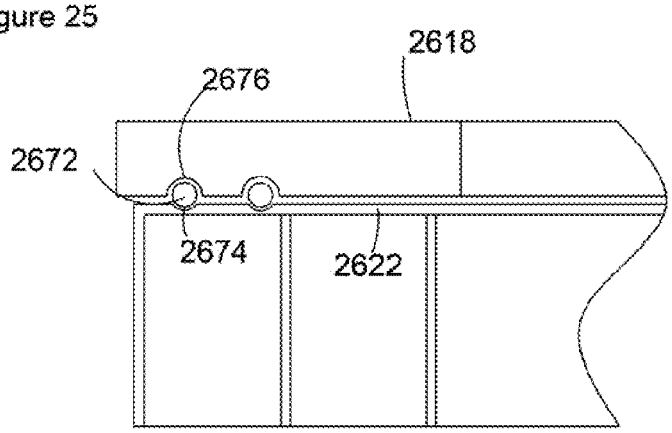
FIG. 25 is cutaway view of the support system for use in the embodiments of FIGS. 10-24 in accordance with the invention.

FIG. 25 illustrates in more detail the use of ball bearings 2672 to prevent a secondary panel 2622 from buckling when pressure is applied. In this extemporary illustration, the ball bearings 2672 are maintained in an upper race 2676 within the electronics housing 2618 and are aligned with a lower race 2674 within the secondary plate 2622. In this manner the distance between the secondary plate 2622 and the electrical housing 2618 will be maintained even when pressure is applied to the electronics house 2618 at any position other than directly above the center. The dimensioning of the upper race 2676 and the ball bearings 2672 must be such that the ball bearings 2672 extend beyond the electrical house 2618 a distance approximately equal to the separation distance between the electrical housing 2618 and the secondary plate 2622. In embodiments where a lower race 2674 is provided in the secondary plate 2622 in which to run the ball bearings 2674, the distance the ball bearings 2672 extend beyond the electrical housing 2618 must be increased about the depth of the lower race 2674. Alternatively, the ball bearings 2672 can be placed in an upper race and a lower race, but not be locked within either race with the pressure exerted by the shaft maintaining the ball bearings within the races. Other methods of maintaining the ball bearings between the housings and the secondary plates will be evident to those skilled in the art. The number of bearings and their placement will be dependent upon the size of the grooming device and will be evident to those skilled in the art.

It should be noted that most embodiments can have a handle extending across the upper housing to enable the user to slip their hand between the handle and base. For clarity of drawings the handle is not shown in all FIGS.

In FIG. 26, the curry comb 2760 contains the motor 2762, batteries 2764 and on/off switch 2766 within the body 2768. At one end of the body 2768 is a recess 2770 that is threaded to receive connecting end 2772 of the handle 2774. In this embodiment, the user has the option as to whether to use only the body 2768 or to add the handle 2774.

In FIGS. 27-29, an alternate embodiment is illustrated where the curry 2800 enables the user to remove the curry rib unit 2820 from the body 2804. In the embodiment the curry rib unit consists of the curry ribs 2822, 2924 and 2826 that are affixed to the secondary plate 2830 and mountable as an inseparable unit. The removal of the curry rib unit 2820 from the body 2804 enables the user to easily wash the curry rib unit 2820. Additionally, curry rib units having curry ribs of varying hardness and/or textures can be manufactured, thereby enabling the user to purchase one complete unit and have the advantage of changing the rib or brush hardness as desired.

One method of accomplishing this is illustrated in more detail in FIGS. 28-30 wherein the underside of the body 2804 has connectors 2806 that extend from the body flange 2808. The connectors 2806 are spaced from the underside 2812 of the body 2804 a sufficient distance to receive the curry flanges 2810 which are, in turn, raised from the curry support plate 2814. The curry flanges 2810 are dimensioned to slide into position between the connectors 2806 and then rotated to place the curry flanges 2810 on top of the connectors 2806. Preferably the connectors will have stops 2816 which prevent the curry flanges from moving. The stops 2816 are placed so that the rotation of the curry ribs 2820 forces the curry flanges 2810 against the stops 2816.

The above in only an example of a connection method and other method will be evident to those skilled in the art. An example of another method would be to directly attach a curry unit to the shaft.

Figure 31:
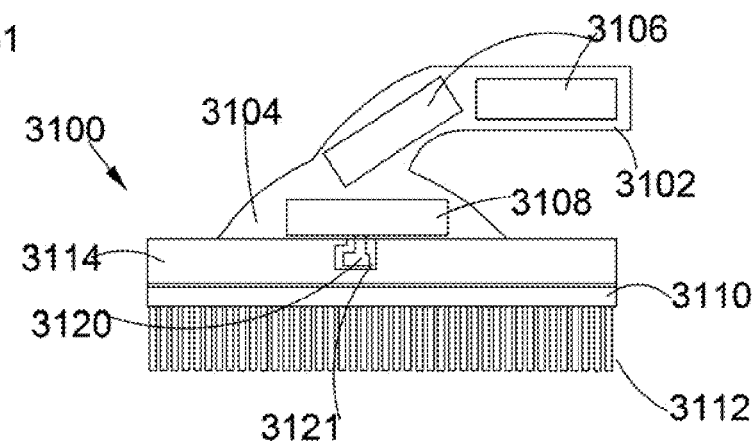
FIG. 31 is a side view of an alternate embodiment of a grooming device wherein grooming head and body rotate in relationship to the electronics housing in accordance with the invention.

FIG. 31 illustrates an alternate embodiment to the disclosed grooming device 3100 in which the grooming head 3110 is removable from the body 3114. In this embodiment the batteries 3106 are maintained in the handle 2102 while the motor 3108 is in the electronics compartment 3104. The shaft 3120 extends from the motor 3108 and is locked into the shaft receiving compartment 3121 through mechanisms known to those in the art. In the illustrated embodiment the body 3114 rotates in relationship to the electronics compartment 3104. The grooming head 3110 is removably attached to the body 3114 through any know mechanism that will be applicable to the materials of manufacture. Rather than the curry ribs illustrated in the prior embodiments, the bristles 3112 of the grooming device 3100 are either plastic or other synthetic or natural material and can be of any desired dimension. There are currently on the market plastic scrubbers or grooming brushes with soft, flexible plastic bristles, the bristle design of which can be incorporated with the disclosed embodiment. Alternatively, the bristles 3112 can be of the same weight and dimensions used for grooming brushes.

Figure 33:
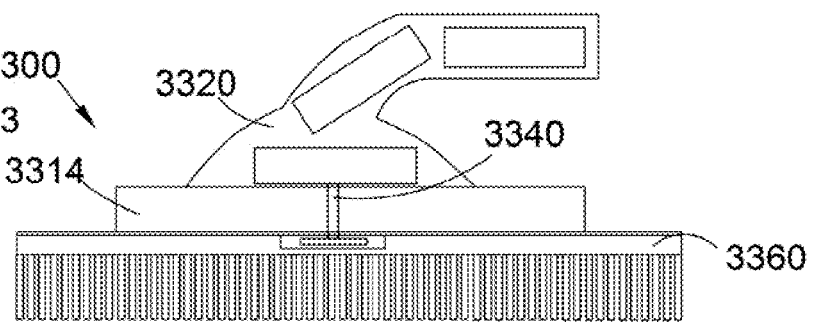
FIG. 33 is a side view of another embodiment illustrating a grooming head with a greater periphery than that of the grooming device body in accordance with the invention.

The curry 3300 as illustrated in FIG. 33 has the grooming head 3360 rotatably connected, through shaft 3340, to the body 3314. The body 3314 is stationary to the electronics compartment 3320. The shaft 3340 is removably connected to the grooming head 3360 by any retention mechanism known in the art.

Figure 32:
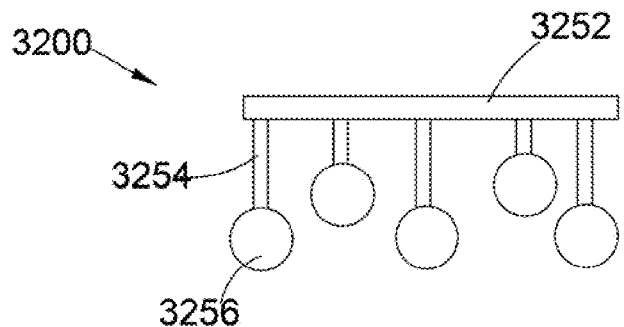
FIG. 32 is a side view of an alternate grooming head for use with the grooming device in accordance with the invention.
Figure 34:
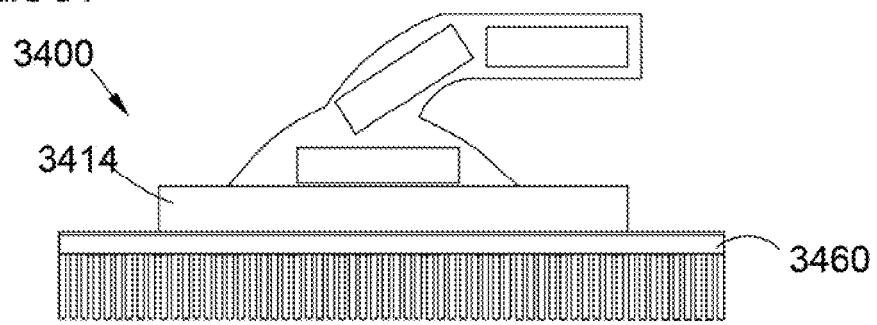
FIG. 34 is a side view of an alternate embodiment of a grooming device wherein grooming head rotates in relationship to the electronics housing and body in accordance with the invention.

The curry 3400 is similar to that illustrated in FIG. 33, with the exception that the curry 3400 illustrated in FIG. 34 has the grooming head 3460 permanently attached to the body 3414. An alternative grooming head 3200 is illustrated in FIG. 32 wherein the base 3252 can be designed to interact to any of the embodiments herein either as a removable head or affixed permanently to a rotating base. In this embodiment, the base 3252 has extensions 3254 extending at a substantially right angle which end in massage rounds 3256. Massage rounds 3256 are one of the many designs used for massage for both human and animal and are used herein as an example as any design of massage head can replace the grooming heads.

It should be noted that any of the above embodiments can be manufactured from waterproof material to enable it to be used to wash an animal. In some instances, the handle 2774 of FIG. 26 may be extended to enable the user to reach the back of the animal without having to stand on a block or stool. Additionally, a soap dispenser can be incorporated in any of the embodiments if desired.

In some applications, such as large stables or zoos, it could be impractical to use the battery powered units as there would be either too many or too large of an animal to groom. Therefore, it should be noted here in that any of the units disclosed can have the batteries eliminated and rely on direct electrical power. In addition to eliminating the need for recharging, the removal of batteries will lighten the unit.

The rotation rate of the devices disclosed herein can vary with end use and type of animal. Additionally, the rotation can be either clockwise, counter clockwise or a combination thereof. It is unlikely that rotation rate of greater than 60 rpm or lower than five would be commonly used. When used for massage, the rotation rate would need to be lower than when used as a grooming device. The rotation speed can be lowered through use of any variable speed mechanisms. In the combination embodiment, a switch would be used to set the motor to either a massage or grooming setting, with the rheostat controlling the speed within the setting. In all embodiments, however, there must be a maximum rotation level that can be achieved to prevent injury to the animal.

All of the foregoing embodiments can be of any size, softness and color. For example, a "baby line" can be produced with smaller and softer brushes in pink or blue. Using the replaceable head design described heretofore, the grooming head can be larger than the body or base plate for use on a full size animal or smaller than the base plate for a smaller, or young, animal.

Rather that use an on off switch, for both convenience and to save batteries, a pressure switch can be incorporated within the electronics that causes the motor to activate upon application of pressure. Thus, when the user removes the curry from the horse's body the rotation automatically stops. Magnets can also be added to the underside of the curry comb to provide magnetic therapy.

Although rubber is generally used for the curry ribs, it should be noted that other materials can be used that are safe for use on the animals. The ribs, or teeth, can also vary in rigidity within the same unit.

What is claimed is:

1. A grooming device for an animal, said grooming device having:

a body, said body having an upper housing and containing a motor, a power source and a control mechanism;

a rotating member, said rotating member having a periphery, being movably affixed to said motor and having at least a pair of connection members, said at least a pair of connection members extending from an outside edge of said periphery, a flex member, said flex member having an interior periphery and an exterior periphery, said interior periphery being greater than said periphery of said rotating member and having—a—receiving area for each of said at least a pair of connection members recessed within said interior periphery, each of said receiving areas dimensioned to enable movement of said least a pair of connection members within each of said receiving area, wherein each of said receiving area has an entry channel at a first angle to an upper surface of said inner periphery, a connecting channel at a second angle to said upper surface and an adjusting channel at a third angle to said upper surface, said at least a pair of connection members being movable within said adjusting channel, said flex member being spaced from said rotating member, at least two springs, said at least two springs spacing said flex member and said rotating member to create a compression area between said flex member and said rotating member, flexible curry ribs, said curry ribs being at substantially right angles to, and affixed to, at least a portion of said exterior periphery of said flex member.

2. The grooming device of claim 1 wherein said receiving areas for said connection members—are—configured to permit said flex member to move from a parallel plane with said rotating member to a non-parallel plane.

3. The grooming device of claim 2 wherein said connection members are prongs, said prongs dimensioned to move freely within said receiving area.

4. The grooming device of said 2 wherein said connection members are bolts, said bolts being movable within said receiving area to permit said flex member to move from a parallel plane with said rotating member.

5. The grooming device of said claim 1 further comprising a plate, said plate being removably adjacent to said flex member and secured to said rotatable member by said springs.

6. The grooming device of claim 1 wherein said curry ribs are removably affixed to said flex member.

7. The grooming device of claim 1 wherein said power source is batteries.

8. The grooming device of claim 1 further comprising a handle, said handle extending from said body at substantially right angles to said curry ribs.

9. The grooming device of claim—8—wherein said handle is removable.

10. The grooming device of claim—8—further comprising a grip, said grip being at substantially right angles to said body.

11. The grooming device of claim 1 further comprising a handle, said handle extending over said upper housing to enable a user to place a hand between said handle and said upper housing.

12. The grooming device of claim 1 wherein said control mechanism controls speed and power to said motor.

13. The grooming device of claim 1 wherein said curry ribs are flexible bristles.

14. The grooming device of claim 1 wherein said power source is a direct electrical connection to a plug.

\* \* \* \* \*